United States Patent [19]

Kihara et al.

[11] Patent Number: 4,653,674
[45] Date of Patent: Mar. 31, 1987

[54] DEVICE FOR DISPENSING GOODS THROUGH ANNULAR DISPENSING PORT

[75] Inventors: Kazuhiko Kihara, Kudamatsu; Kinichiro Tsunekane, Matsudo; Hajime Shidara, Kawaguchi; Tadashi Makino, Tokyo, all of Japan

[73] Assignees: Ohbayashi-Gumi, Ltd., Osaka; Hitachi, Ltd.; Hitachi Sanki Engineering Co., Ltd., both of Tokyo, all of Japan

[21] Appl. No.: 272,003

[22] Filed: Jun. 9, 1981

[30] Foreign Application Priority Data

Jun. 9, 1980 [JP] Japan ............................. 55-76619

[51] Int. Cl.⁴ .......................................... B65G 65/48
[52] U.S. Cl. .................................. 222/342; 222/410; 414/325
[58] Field of Search ............... 222/342, 410, 252, 265, 222/408, 411, 286, 367, 370; 414/325

[56] References Cited

U.S. PATENT DOCUMENTS

| | | | |
|---|---|---|---|
| 2,100,315 | 11/1937 | Harper | 222/286 X |
| 2,709,537 | 5/1955 | Taylor | 222/252 X |
| 3,877,587 | 4/1975 | Ishizaki | 414/325 |
| 4,024,985 | 5/1977 | Iinoya et al. | 222/410 X |
| 4,361,254 | 11/1982 | Teraoku et al. | 222/410 X |

*Primary Examiner*—Joseph J. Rolla
*Assistant Examiner*—Kevin P. Shaver
*Attorney, Agent, or Firm*—Antonelli, Terry & Wands

[57] ABSTRACT

A goods dispensing device including an annular dispensing port formed in a container, an annular shelf located in a position for receiving the goods released through the annular dispensing port, a table rotatably supported in a position for receiving the goods flowing downwardly from the shelf, a ring located along the shelf for rotation independently of the table, a rotary drive unit connected to the table through motive force transmitting mechanism, a rotary drive unit connected to the ring through motive force transmitting mechanism, scrapers fixedly supported on the ring and projecting above the shelf, a guide scraper fixedly supported and projecting above the table, and a goods conveyor arranged below the guide scraper for conveying the goods dispensed from the container through the annular dispensing port. There is a relative difference between the rotary movements of the scraper rotating with the ring as a unit and the table. The scrapers are operative during the rotary movement of the ring to sweep the goods from the shelf onto the table, so that the goods can be deposited in uniform and continuous loading condition on the table that has a relative difference in movement with respect to the scrapers. The goods deposited on the table are released from the table by the guide scraper during rotation of the table, to be loaded on the conveyor in uniform and continuous condition.

8 Claims, 5 Drawing Figures

DEVICE FOR DISPENSING GOODS THROUGH ANNULAR DISPENSING PORT

FIELD OF THE INVENTION

This invention relates to devices for dispensing goods to be handled from a container for transfer to goods conveying means, and more particularly it, to a device for dispensing goods to be handled from a container having a goods dispensing port of an annular shape.

DESCRIPTION OF THE PRIOR ART

Figure 1:
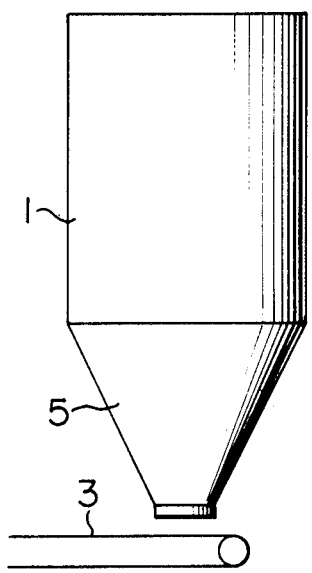
FIG. 1 is a diagrammatic view of a silo and goods conveying means of the prior art arranged in combination.

When bulk goods to be handled, such as, for example, coal, are stored, they are stored in what is generally referred to as a silo 1, which, as shown in FIG. 1, is provided with a hopper 5 for transferring the goods to a belt conveyor means 3 for conveying the bulk goods to the desired destination.

Figure 2:
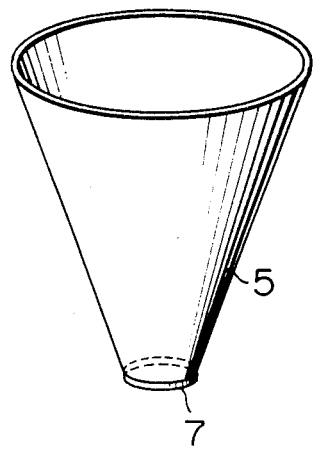
FIG. 2 is a perspective view, on an enlarged scale, of a hopper of the silo shown in FIG. 1.

As shown in FIG. 2, the hopper 5 of the prior art is of an inverted frustoconical form, with a circular top and a curved surface tapering evenly to a base formed with a dispensing port 7. The hopper 5 of this shape performs the function of compressing the goods descending through the hopper 5 toward the dispensing port 7 in a circumferential direction. Thus, the hopper 5 of the prior art has the disadvantage of tending to be choked up with the goods to be handled, blocking the smooth movement of goods from the silo 1 to the belt conveyor 3.

SUMMARY OF THE INVENTION

Accordingly, a principal object of the invention is to provide a device for dispensing goods to be handled from a container and transferring the same to goods conveying means which is capable of smoothly dispensing the goods to be handled through an annular goods dispensing port.

Another object of the present invention is to provide a device of the type described capable of carrying out dispensing of the goods to be handled uniformly and continuously without any interruption and with a high degree of efficiency.

According to the invention, there is provided a device for dispensing goods to be handled from a container, comprising a dispensing port of the annular shape formed in the container and an annular shelf located in a position for receiving the goods released through the annular dispensing port A table is rotatably supported in a position for receiving the goods moved downwardly from the shelf, with a ring being located along the shelf for rotation independently of the table. A rotary drive means is connected to the table through motive force transmitting means, with a rotary drive means being connected to the ring through motive force transmitting means. Scrapers are fixedly supported on the ring and project above the shelf, with a guide scraper being fixedly supported and projecting above the table. Conveying means are arranged below the guide scraper for conveying the goods dispensed from the container through the annular dispensing port.

DETAILED DESCRIPTION OF THE PREFERRED EMBODIMENT

Figure 3:
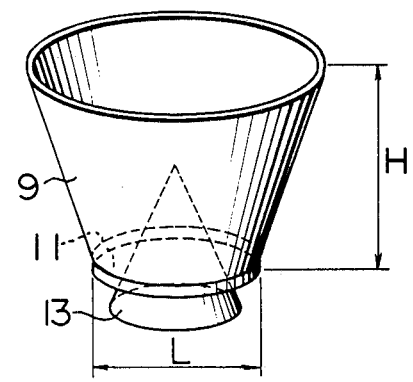
FIG. 3 is a perspective view schematically showing the configuration of a hopper used in an embodiment of the present invention.

As shown in FIG. 3, a hopper 9 of the present invention includes a dispensing port 11 of an increased diameter L, and a conical structure 13 inserted in the dispensing port 11 from below. The hopper 9 has a reduced height H as compared with hoppers of the prior art and a smaller volume. The dispensing port 11 is of an annular form as it is defined between the lower end of the hopper 9 and the conical structure 13. The goods which descend through the hopper 9 toward the dispensing port 11 are not subjected to a high compressive force directed circumferentially of the hopper 9 and, consequently, are released smoothly from the annular dispensing port 11.

The goods dispensed from the hopper 9 through the dispensing port 11 of the annular shape are released from the dispensing port 11 in spread-out condition due to the annular shape of the dispensing port 11. Thus, the goods released from the dispensing port 11 in a spread-out condition need be scraped together for transfer to goods conveying means, such as, for example, a belt conveyor.

Figure 4:
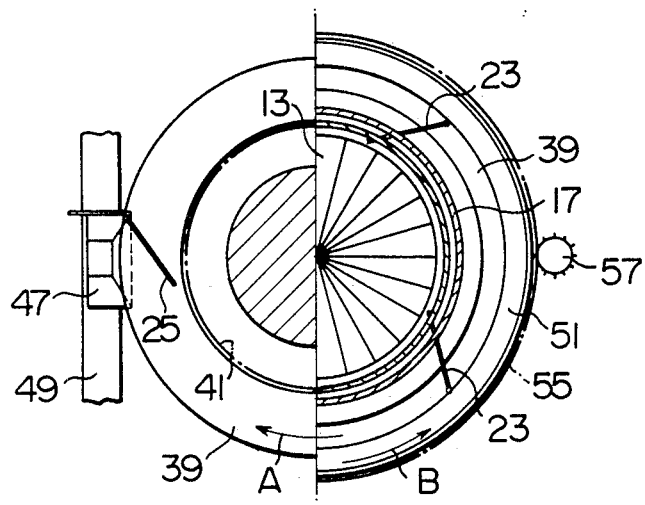
FIG. 4 is a sectional view taken along the line IV—IV in FIG. 5, showing the dispensing device comprising one embodiment of the present invention.
Figure 5:
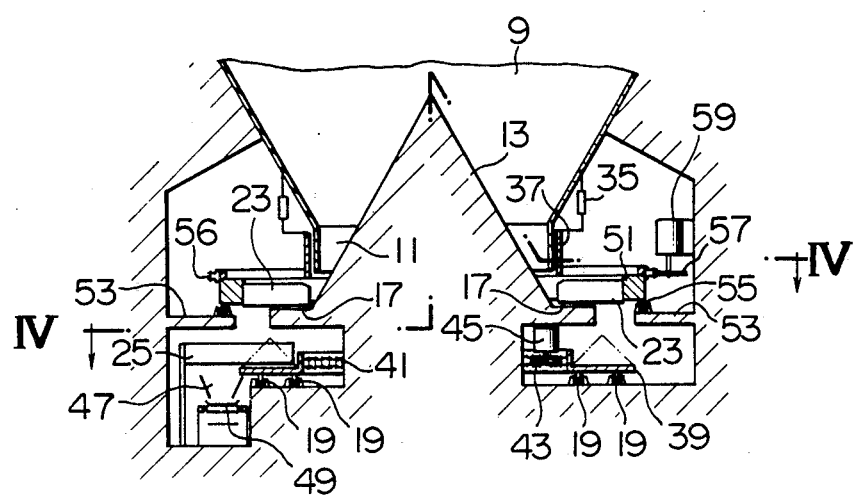
FIG. 5 is a vertical sectional view of the dispensing device shown in FIG. 4.

As shown most clearly in FIGS. 4 and 5, the conical structure 13 has a horizontal extension projecting outwardly from a bottom thereof beyond an opening and closing gate 37 to provide a horizontal shelf 17. The gate 37 is adapted to be moved vertically by cylinders 35. A table 39, of a doughnut shape, is located below an outer end of the shelf 17, with the table 39, supported on a floor by rollers 19, having a chain 41 secured to the inner periphery thereof along the entire peripheral extent thereof. A chain sprocket 43, engaging the chain 41, is secured to a rotary shaft of a motor 45 secured to the undersurface of the shelf 17. A guide scraper 25 projects above the surface of the table 39 and, as shown in FIG. 4, is disposed obliquely across the surface of the table 39 and, as shown in FIG. 5, is fixedly supported on the floor. A chute 47 is located along a portion of the outer periphery of the table 39 in a position disposed below the guide scraper 25. A belt conveyor 49, arranged below the lower opening of the chute 47, is located on the floor.

A plurality of scrapers 23 are fixedly secured to a horizontal ring 51 and project above the surface of the shelf 17 in such a manner that the scrapers 23 extend obliquely across the surface of the shelf 17 as shown in FIG. 4. The ring 51 is supported on rollers 55 mounted on a ledge 53 projecting horizontally inwardly from a side wall. A chain 56 is secured to the outer periphery of the ring 51 through the entire circumferential extent thereof, with the chain 56 being engageable with a chain sprocket 57 secured to a rotary shaft of a motor 59 secured to the side wall.

In the illustrated embodiment the goods, descending through the hopper 9 and collected on the surface of the shelf 17, are temporarily deposited on the shelf 17 forming a suitable incline. To sweep the goods on the shelf 17 away therefrom by the scrapers 23, the motor 59 is actuated to rotate the chain sprocket 57 which drives the ring 51 to rotate on the rollers 55 through the chain 56 engaging the chain sprocket 57. The motor 59 has its direction of rotation set beforehand in such a manner that the ring 51 rotates in the direction of an arrow B shown in FIG. 4. At the same time, the motor 45 is actuated to rotate the chain sprocket 43, so that the table 39 is rotated on the rollers 19 through the chain 41 engaging the chain sprocket 43. The motor 45 has its direction of rotation set beforehand in such a manner that the table 39 rotates in the direction of an arrow A shown in FIG. 4. Thus, the table 39 and the ring 51 having the scrapers 23 secured thereto rotate in the opposite directions.

As the ring 51 rotates, the scrapers 23 secured to the ring 51 move above the surface of the shelf 17. Since the scrapers 23 are obliquely disposed across the surface of the shelf 17, the goods deposited on the shelf 17 are swept away therefrom by the scrapers 23 onto the surface of the table 39. Since the direction of movement of the scrapers 23 (the direction of arrow B) and the direction of rotation of the table 39 (the direction of arrow A) are opposite each other, the table 39 is in a relative rotary relationship with respect to the scrapers 23. Thus, the goods swept away from the shelf 17 by the scrapers 23 are not concentrated in specific positions but are deposited uniformly and continuously without interruption on the table 39. Such continuous loading condition can be achieved when there is a relative difference between the movements of the scrapers 23 and the table 39. For example, even if the table 39 and the scrapers 23 move in the same direction, the continuous loading condition can be achieved by providing a difference in velocity between them.

The goods deposited in continuous loading condition on the table 39 impinge on the guide scraper 25 that is stationary as the table 39 moves in the direction of the arrow A, so that the goods are swept by the guide scraper 25 into the chute 47. The goods are continuously swept away from the table 39 without a break into the chute 47 at a constant rate per unit hour or per unit rotation of the table 39 and transferred to the belt conveyor 49 through the lower end of the chute 47. Thus, it is possible to convey the goods to the destination in uniform and continuous loading condition or in constant quantity distribution condition permitting quantity control to be readily effected.

By interrupting the movement of the scrapers 23 by, for example, shutting down the motor 59 while permitting the table 39 to continue to rotate, the goods on the table 39 can be transferred to the belt conveyor 49 to empty the surface of the table 39.

In the illustrated embodiment the ring 51 and the table 39 are driven by different motors 45 and 59 independently of each other. However, the invention is not limited to this specific form of drive mechanism and that one motor, instead of the two motors 45 and 59, may be used and rotations of different directions may be transmitted therefrom to the ring 51 and table 39 through gearing.

The advantages offered by the embodiment of the invention are summarized as follows.

(1) The goods are deposited uniformly on the entire surface of the table 39, so that the loading efficiency can be increased. Even if the volume of goods swept away by each scraper 23 increases, it is possible to cope with the increase, so that it is possible to increase the volume of goods swept away by the scrapers and at the same time to dispense the goods in constantly distributed condition.

(2) An increase in the volume of goods swept away by the scrapers 23 from the shelf 17 enables the opening of the gate 37 to be increased. An increase in the opening of the gate 37 permits dispensing of the goods through the annular dispensing port 11 to take place smoothly because blocking of the port 11 by the goods can be avoided.

(3) An increase in the volume of goods swept away by each scraper 23 enables the number of the scrapers 23 to be reduced.

(4) Depositing of the goods on the surface of the table 39 in continuous loading condition enables the width of the table 39 to be reduced and its size to be reduced as compared with depositing of the goods in stacks spaced apart from one another.

(5) Since the goods are continuously transferred from the table 39 to the belt conveyor 49, it is possible to reduce the width and overall size of the chute 47 and conveyor 49.

(6) The goods are handled continuously without interruption when they are dispensed from the hopper 9 and transferred to the conveyor 49, so that the operation efficiency can be increased and quantity control can be readily effected.

(7) The goods dispensing operation can be performed smoothly because the hopper 9 is difficultly choked with the goods handled which are not subjected to a high compressive force in the hopper 9 due to the provision of the annular dispensing port 11.

From the foregoing description, it will be appreciated that the dispensing device according to the invention enables dispensing of goods to be handled and their transfer to conveying means to take place smoothly without the container being choked with the goods, thanks to the provision of a dispensing port of the annular shape. The device according to the invention is capable of increasing the efficiency with which the goods to be handled are dispensed, because the goods can be handled in uniform and continuous condition without interruption.

What is claimed is:

1. A device for dispensing goods to be handled from a container, a stationary conical member having a portion thereof extending into an opening of the container and a base portion disposed below the opening such that a portion of an outer conical surface extends downwardly beyond the opening of the container; comprising:

an annular dispensing port formed between the outer conical surface of said conical member and a wall surface of a wall defining the opening of the container;

an annular shelf disposed below said dispensing port and extending horizontally outwardly from the conical surface of said conical member for receiving the goods released through the annular dispensing port, said annular shelf having a top surface continuous with the conical surface of said conical member and having a radial width a center of which is offset radially outwardly of the dispensing port;

a table rotatably supported in a position for receiving the goods flowing downwardly from the shelf;

a ring located along the shelf for rotation independently of the table;

drive means connected to the table for driving the same;

drive means connected to the ring so as to drive the same independently of said table;

at least one scraper fixedly secured to said ring and projecting above the top surface of the shelf for causing the goods deposited on said shelf from said dispensing port to flow downwardly onto said table when said ring is driven;

a stationarily mounted guide scraper projecting above a top surface of the table for causing the goods deposited thereon from said shelf to flow downwardly when the table is driven; and conveying means arranged below the guide scraper for receiving and conveying the goods deposited thereon from the table by the guide scraper.

2. A device as claimed in claim 1, wherein said table is rotated in one direction and said ring is rotated in a direction opposite to the direction of said table.

3. A device as claimed in claim 1, further comprising a gate means for opening and closing the dispensing port, and means for vertically displacing the gate means so as to enable a control of an opening and closing of the dispensing port.

4. A device as claimed in claim 1, wherein said ring is disposed radially outwardly of an outer periphery of said shelf and at a position above the top surface of the shelf.

5. A device for dispensing goods from a container, the device comprising:

a stationary conical member having a portion thereof extending into an opening of said container and a base disposed below the opening of the container;

an annular dispensing port formed between the outer conical surface of said conical member and a wall surface of a wall defining the opening of the container;

an annular shelf disposed below said dispensing port and extending horizontally outwardly from the conical surface of said conical member for receiving the goods released through the annular dispensing port, said annular shelf having a top surface continuous with the conical surface of said conical member and having a radial width the center of which is offset radially outwardly of the dispensing port;

a table rotatably supported below said annular shelf, the table having a horizontally extending top surface with a width such that a surface portion thereof extends beyond an outer periphery of the shelf so as to enable goods from the shelf to be deposited on said top surface thereof;

a ring disposed adjacent to and beyond an outer periphery of said shelf, said ring being mounted for rotation independently of said table;

drive means connected to said table and said ring for rotatably driving the same;

at least one scraper fixedly secured to said ring and projecting above the top surface of the shelf for causing the goods deposited on said shelf from said dispensing port to flow downwardly onto said table when said ring is driven;

a stationarily mounted guide scraper projecting above the top surface of the table for causing the goods deposited thereon from said shelf to flow downwardly when the table is driven; and conveying means arranged below the guide scraper for receiving and conveying goods deposited thereon from the table by the guide scraper.

6. A device as claimed in claim 5, wherein said ring is disposed at a position above said table.

7. A device as claimed in claim 6, wherein said ring is disposed above the top surface of said shelf.

8. A device as claimed in claim 6, further comprising a gate means for opening and closing the dispensing port, and means for vertically displacing the gate means so as to enable a control of an opening and closing of the dispensing port.

* * * * *